(12) United States Patent
Yamaguchi

(10) Patent No.: US 6,471,418 B1
(45) Date of Patent: Oct. 29, 2002

(54) OPTICAL CONNECTOR

(75) Inventor: Toru Yamaguchi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/456,916

(22) Filed: Dec. 7, 1999

(30) Foreign Application Priority Data

Aug. 5, 1999 (JP) .......................................... 11-222163

(51) Int. Cl.$^7$ ................................................ G02B 6/36
(52) U.S. Cl. ........................... 385/78; 385/76; 385/77; 385/139; 385/70; 385/72
(58) Field of Search .................... 385/78, 53, 56, 385/59, 60, 66, 73, 72, 76, 77, 80, 81, 86, 87, 84, 92, 139

(56) References Cited

U.S. PATENT DOCUMENTS

| | | | |
|---|---|---|---|
| 5,016,968 A | * 5/1991 | Hammond et al. | 385/78 |
| 5,329,603 A | 7/1994 | Watanabe et al. | 385/86 |
| 5,717,802 A | 2/1998 | Briggs et al. | 385/75 |
| 5,963,690 A | * 10/1999 | Cheng | 385/76 |
| 6,019,520 A | * 2/2000 | Lin et al. | 385/76 |
| 6,234,682 B1 | * 5/2001 | Nagaoka et al. | 385/78 |

FOREIGN PATENT DOCUMENTS

| | | | |
|---|---|---|---|
| EP | 0 078 399 A1 | 5/1983 | ............... 385/76 X |
| EP | 0 855 610 A2 | 7/1998 | ............... 385/76 X |
| GB | 2 032 130 A | 4/1980 | ............... 385/76 X |
| GB | 2 253 278 A | 9/1992 | ............... 385/76 X |
| WO | 95/08784 | 3/1995 | ............... 385/76 X |
| WO | 97/19378 | 5/1997 | ............... 385/76 X |

* cited by examiner

*Primary Examiner*—Brian Healy
(74) *Attorney, Agent, or Firm*—Armstrong, Westerman, Hattori, McLeland & Naughton, LLP

(57) ABSTRACT

An optical connector consists of a ferrule unit including an optical fiber, a ferrule rigidly fitted to one end of the optical fiber, and a spring placed around the optical fiber which abuts at one end against the ferrule, a plug housing which receives the ferrule unit, and a spring cap having a rear wall and a fiber letting-out portion formed in the rear wall through which the optical fiber is let out. The spring cap is fittable, with the spring abutting at the other end thereagainst, to the plug housing. The plug housing has a resilient protecting means which, when the spring cap is fitted to the plug housing, overhangs a part of the optical fiber let out through the fiber letting-out portion of the spring cap. The optical fiber is protected at that port let out of the spring cap if bent.

7 Claims, 6 Drawing Sheets

OPTICAL CONNECTOR

BACKGROUND OF THE INVENTION

1. Field of the Invention

This invention relates to an optical connector having an optical plug of a structure in which a spring cap is fitted to a plug housing.

2. Description of the Related Art

An optical connector is used in connecting, for example, an optical fiber (or optical fiber cable) which constitutes a multiple transmission circuit in a vehicle such as an automobile to a transmitter, receiver or another cable.

Such an optical connector, as shown in FIG. 9, consists of an optical plug 1 and a not-shown mating receptacle, the optical plug 1 including ferrule units 2, 2, a plug housing 3, and a spring cap 4. The ferrule units 2, 2, each having an optical fiber 5, are assembled to the spring cap 4 and then inserted into the corresponding receiving cavities 6, 6 of the plug housing 3 until the spring cap 4 fits to the plug housing 3.

More specifically, each ferrule unit 2 consists of the optical fiber 5, a spring 7 and a ferrule 8. To the optical fibers 5, 5, the spring cap 4 and the springs 7, 7 are in this order assembled, and then the ferrules 8, 8 so as to be located at the ends of the optical fibers 5, 5. Each spring 7 abuts at one end against the rear end surface of the related ferrule The plug housing 3, which is of box-like rectangular shape, has the receiving cavities 6, 6 formed to extend longitudinally therethrough. On its upper wall at the center, the plug housing 3 has a locking arm 9 used in coupling with the not-shown receptacle.

The spring cap 4 is designed to fit over the rear end of the plug housing 3 and has at the rear wall a support 10 with throughholes 11, 11 formed therein through which the optical fibers 5, 5 are let out. Each spring 7 abuts at the other (rear) end against the spring cap rear wall at the inner side.

With the spring cap 4 of the above conventional optical connector, however, because as shown in FIG. 10 each optical fiber letting-out throughhole 11 of the support 10 is formed merely cylindrical, if the optical fiber 5 is excessively bent, for example, by accident as shown by the imaginary line, stresses tend to focus on the optical fiber 5 at the throughhole 11, resulting in breakage of the optical fiber 5 and a malfunction in the transmission circuit.

SUMMARY OF THE INVENTION

This invention has been accomplished to overcome the above drawback and an object of this invention is to provide an optical connector which protects the optical fiber at its optical-fiber letting-out portion.

In order to attain the object, according to this invention, there is provided an optical connector which comprises: a ferrule unit including an optical fiber, a ferrule rigidly fitted to one end of the optical fiber, and a spring placed around the optical fiber which abuts at one end against the ferrule; a plug housing which receives therein the ferrule unit; and a spring cap having a rear wall and a fiber letting-out portion formed in the rear wall through which the optical fiber is let out, the spring cap being fittable, with the spring abutting at an opposite end thereagainst, to the plug housing, wherein the plug housing has a resilient protecting means which, when the spring cap is fitted to the plug housing, overhangs a part of the optical fiber let out through the fiber letting-out portion of the spring cap.

Preferably, the resilient protecting means comprises a cantilever plate extending in a fitting direction of the spring cap and the plug housing.

Preferably, the resilient protecting means overhangs the part of the optical fiber let out through the fiber letting-out portion, at a side toward which the part of the optical fiber is assumed to be bent.

Preferably, the fiber letting-out portion comprises a slit formed in the rear wall of the spring cap through which the optical fiber and the resilient protecting means extend outside the spring cap.

Advantageously, the spring cap has an optical-fiber support of U-shaped cross section provided on the rear wall of he spring cap to surround, along with the resilient protecting means, the part of the optical fiber let out through the fiber letting-out portion.

Preferably, the spring cap has a plurality of resilient cantilever protecting plates provided on the rear wall of the spring cap to surround, along with the resilient protecting means, the part of the optical fiber let out through the fiber letting-out portion.

Preferably, three of the resilient cantilever protecting plates are provided to be located on left and right sides and a lower side of the fiber letting-out portion to surround, along with the resilient protecting means, the part of the optical fiber on a total of four sides around the part of the optical fiber.

The above and other objects, features and advantages of this invention will become apparent from the following description and the appended claims, taken in conjunction with the accompanying drawings.

DESCRIPTION OF THE PREFERRED EMBODIMENTS

Embodiments of this invention will now be described with reference to the attached drawings.

Figure 1:
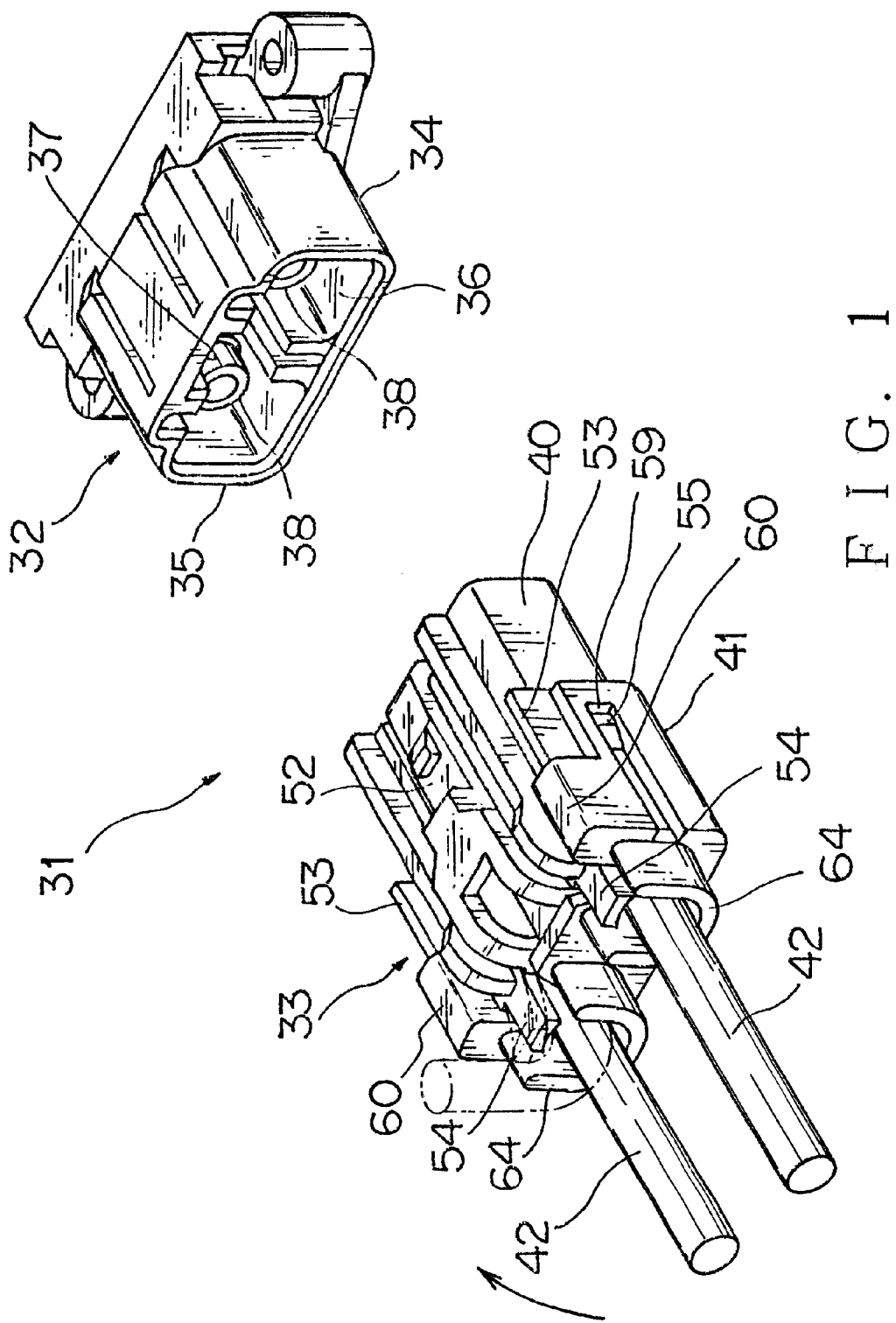
FIG. 1 is a perspective view of an optical connector according to one embodiment of this invention, with its receptacle and optical plug shown separated.

In FIG. 1, denoted 31 is an optical connector for use in a multiple transmission circuit in a vehicle such as an automobile, the optical connector 31 consisting of a receptacle 32 and an optical plug 33. As will be apparent from the following description, the optical plug 33, if a later-described optical fiber 42 is bent to an excessive degree, alleviates concentration of stress and protects the optical fiber 42 at its letting-out portion from such stress.

The receptacle 32 has a connector housing 34 which opens at the front and rear. The optical plug 33 is fitted through the front opening 35 in the connector housing 34. Denoted 36 is a fitting chamber for the optical plug 33, and inside the fitting chamber 36 is formed a locking groove 37 for a later-described locking arm 52. Sleeves and then optical element modules (either not shown), which constitute the receptacle 32, are placed through the rear opening (not shown) in the connector housing 34, followed by closing the rear opening with a rectangular plate-like cap (not shown). Denoted 38 are receiving cylinders to each of which are fitted at the opposite ends the sleeve and a later-described ferrule 43.

Figure 2:
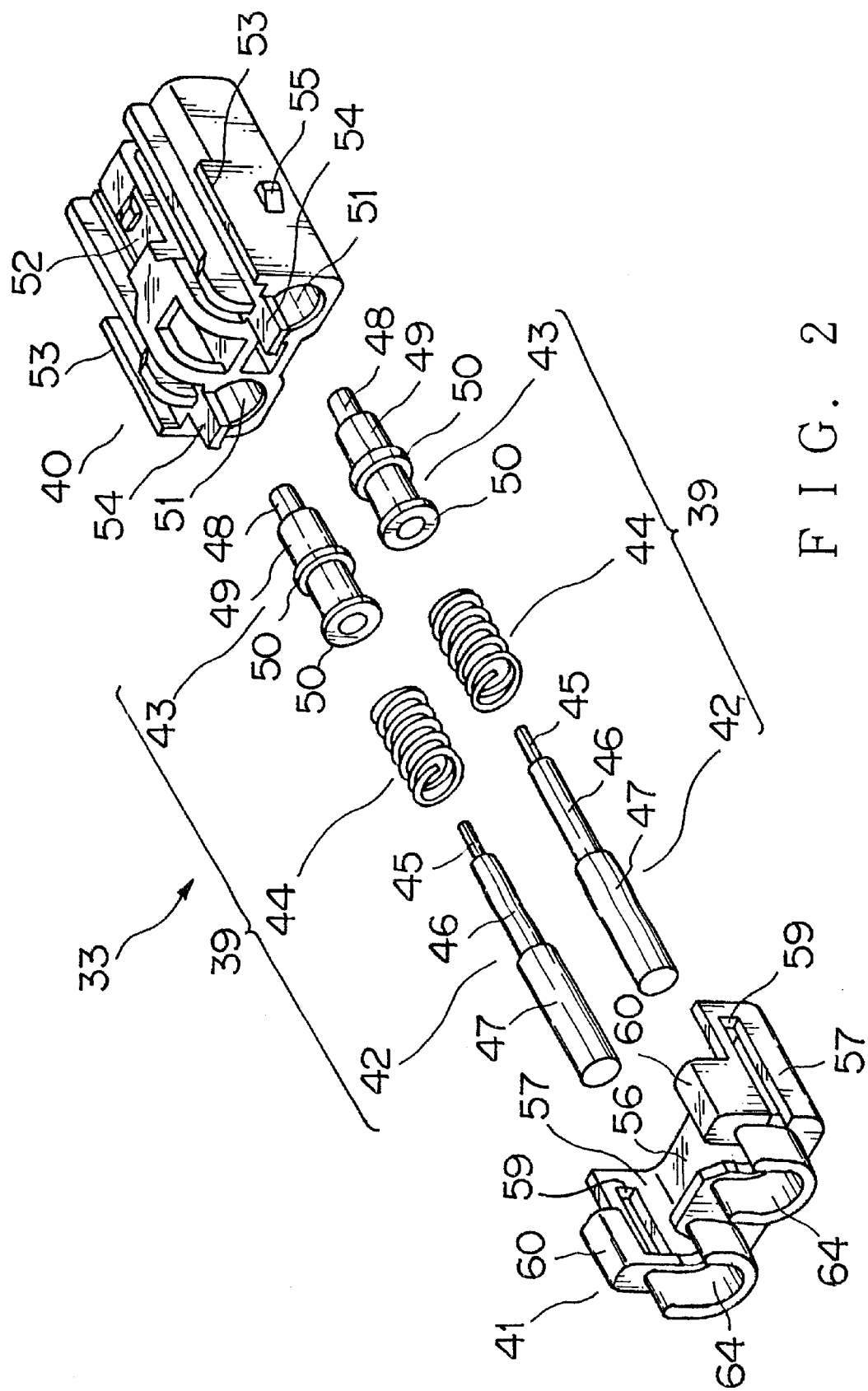
FIG. 2 is an exploded perspective view of the optical plug of FIG. 1.

The optical plug 33, as shown in FIG. 2, consists of ferrule units 39, 39, a plug housing 40 which receives the ferrule units 39, 39, and a spring cap 41 fitted over the rear end of the plug housing 40.

Each ferrule unit 39 consists of an optical fiber 42, the ferrule 43 fitted at the front end of the optical fiber, and a spring 44 placed around the optical fiber 42, between the ferrule 43 and the spring cap 41.

The optical fiber 42 consists of a core 45 of a transparent resin such as PMMA (polymethyl methacrylate (methacrylate resin)), a synthetic-resin made first sheath 46 around the core, and a synthetic-resin made second sheath 47 around the first sheath. The optical fiber 42 is peeled at the front end to be inserted into the related ferrule 43.

The ferrule 43 is made of synthetic resin and has a cylindrical small diameter portion 48 and a large diameter portion 49. The core 45 of the optical fiber 42 is received in the small diameter portion 48, and the first sheath 46 in the large diameter portion 49. The ferrule 43 and the related optical fiber 42 are firmly fixed together with an adhesive or the like.

The large diameter portion 49 of each ferrule 43 is circumferentially provided with two flanges 50, 50, and the spring 44 around the optical fiber 42 is interposed between the rearward flange 50 and the spring cap 41.

Figure 3:
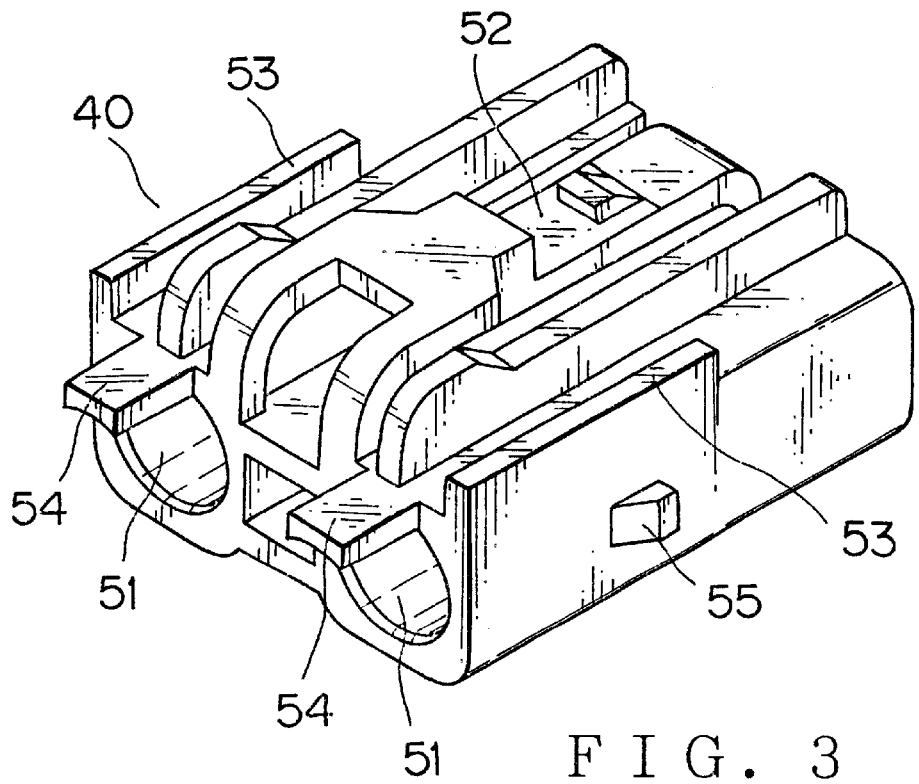
FIG. 3 is an enlarged perspective view of a plug housing in FIG. 2.

The plug housing 40, as shown in FIGS. 2 and 3, has a box-like rectangular shape and has hollow receiving cavities 51, 51 formed therein which receive the ferrule units 39, 39. On its upper wall, the plug housing 40 has a locking arm 52 lockingly engageable in the locking groove 37 of the receptacle 32 (FIG. 1), a pair of guide plates 53, 53 for the spring cap 41, and protecting projections 54, 54 for the respective optical fibers 42, 42. On its side walls at an intermediate length thereof, the plug housing 40 has locking projections 55, 55 (only one is shown) for locking engagement with the spring cap 41. Each guide plate 53, which is integral with and in the same vertical plane as the related side wall of the plug housing 40, extends in a fitting direction of the plug housing 40 with the spring cap 41, from the rear end of the side wall to an intermediate length thereof.

The protecting projections 54, 54 are cantilever projections (plate-like cantilever projections in the present embodiment) provided at the rear end of the plug housing 40, have resiliency and, when the spring cap 41 and the plug housing 40 are fitted together, project outside the spring cap 41 to prevent harsh bending of the optical fibers 42, 42 let out of the spring cap 41 at the rear end.

In other words, in the present embodiment, on the assumption that the optical fibers 42, 42 would be excessively bent upwardly (FIG. 1), the protecting projections 54, 54 overhang (extend from the upper wall of the plug housing 40) at the upper edges of the openings of the receiving cavities 51, 51 formed at the rear end of the plug housing 40. Due to this arrangement, the protecting projections 54, 54, if the optical fibers 42, 42 are harshly bent, resiliently contact with and act on the optical fibers 42, 42 in the direction of restricting their bending and pushing them back. The concentration of stress on the optical fibers 42, 42 at the letting-out portion is thus alleviated to protect the optical fibers 42, 42.

Because the protecting projections 54, 54, as indicated above, are provided to overhang the optical fibers 42, 42 at a side toward which the optical fibers are assumed to be bent, the protecting projections 54, 54 reliably make resilient contact with the optical fibers 42, 42 bent in the thus assumed direction.

The protecting projections 54, 54 may be provided to have a thickness that becomes smaller toward their tip ends.

Figure 4:
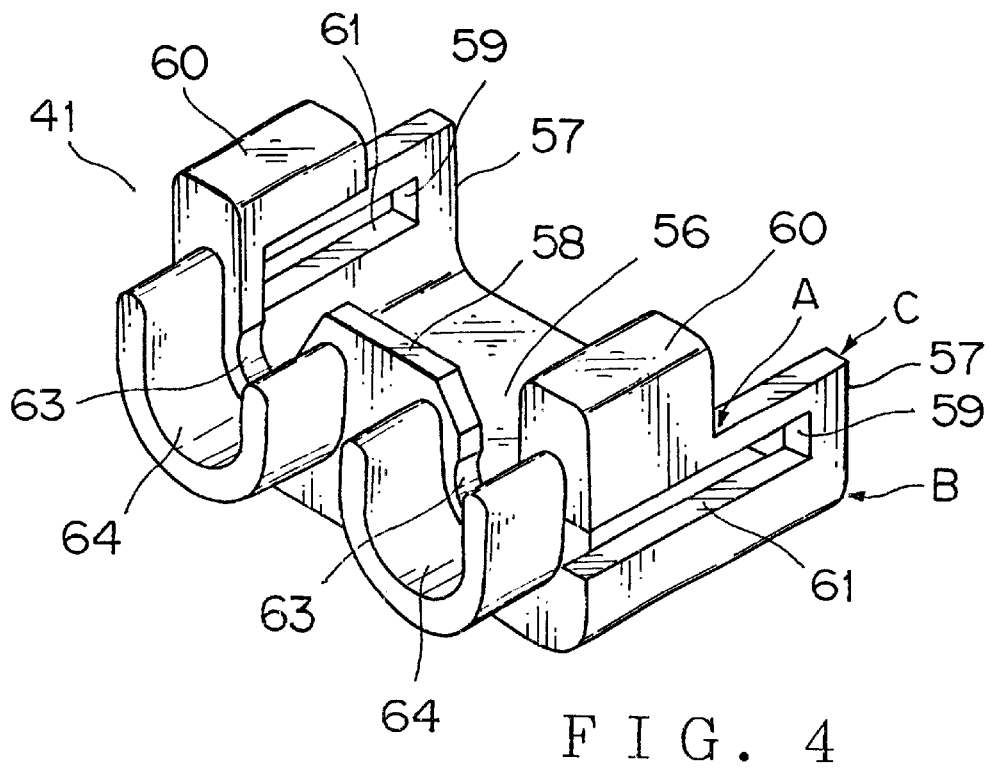
FIG. 4 is an enlarged perspective view of a spring cap in FIG. 2.
Figure 5:
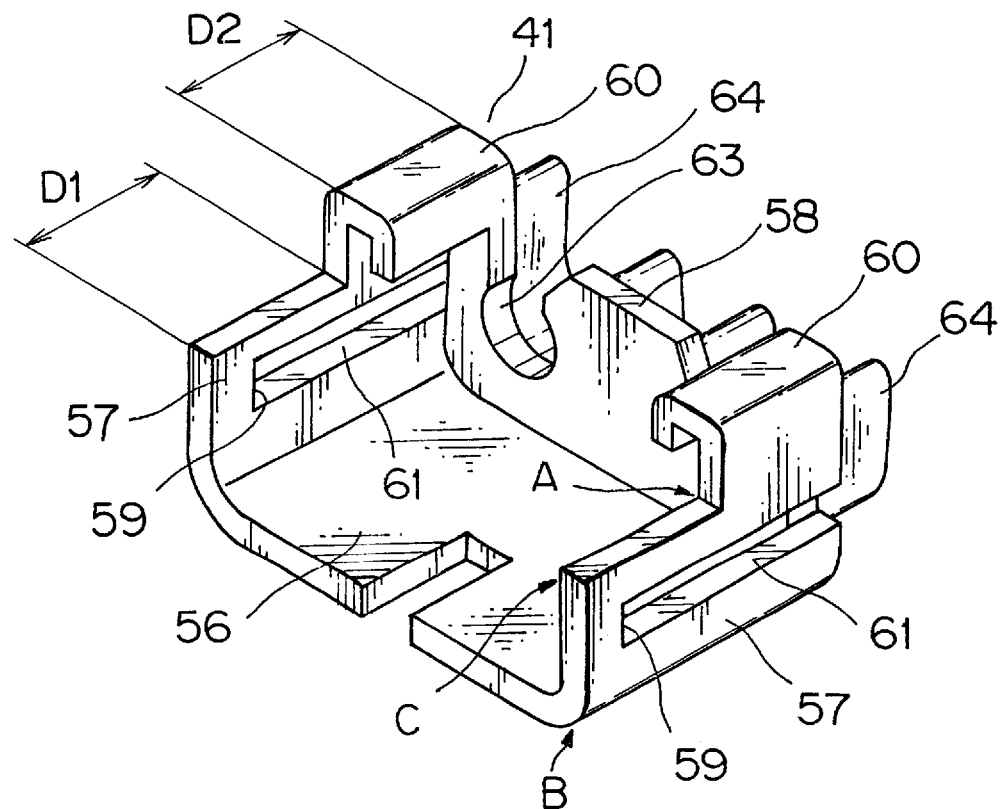
FIG. 5 is an enlarged perspective view of the spring cap in FIG. 2, seen from the plug housing side.
Figure 6:
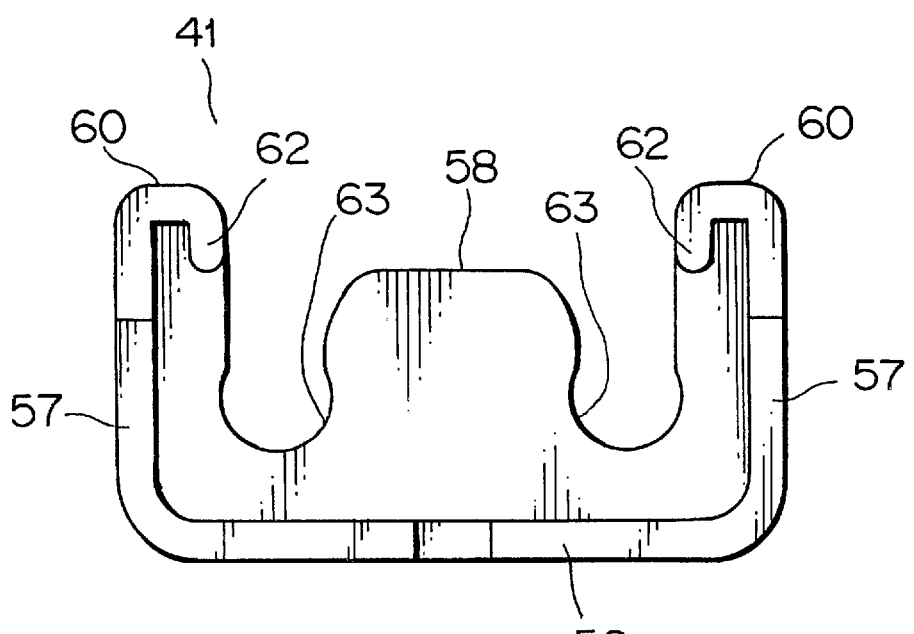
FIG. 6 is a front view of the spring cap in FIG. 2.
Figure 7:
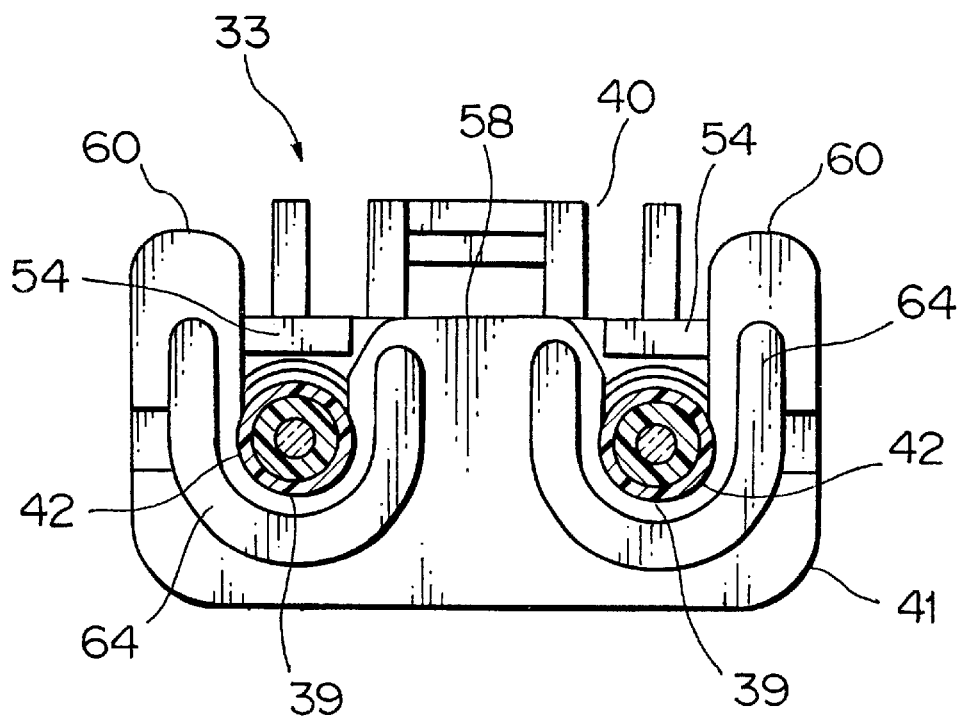
FIG. 7 is a rear view of the optical plug of FIG. 1.

The spring cap 41 is provided in one piece and, as shown in FIGS. 4 to 6, consists of a base wall 56, a pair of opposite side walls 57, 57 and a rear wall 58 and is fittable, as mentioned above, over the rear end of the plug housing 40.

Each side wall 57, as shown in FIG. 5, has two sections D1, D2 adjoining each other in the longitudinal direction thereof, the section D1 having a longitudinal slit 61 formed therein and a locking portion 59 located at the front end of the slit 61 (the end toward the plug housing 40) for locking engagement with the related locking projection 55 of the plug housing 40 (FIG. 3), and the section D2 having at the inner side a guide groove 60 for sliding therein of the related guide plate 53 (FIG. 3). Because the locking portion 59 is located on a side toward the plug housing 40 as compared with a line connecting the points A and B on the spring cap 41 (FIGS. 4 and 5), the locking portion 59 easily comes into engagement with the related locking projection 55 if, during fitting the spring cap 41 to the plug housing 40, the side wall 57 rides on the locking projection 55, bends outwardly at the front upper portion C, and rides over the locking projection 55. The slit 61 formed in each side wall 57 reduces the rigidity of the side wall 57 and makes its front upper portion C bendable more easily.

Each guide groove 60 is provided in an inverted U shape and extends in the fitting direction of the plug housing 40 with the spring cap 41. The guide groove 60 receives from the front end the related guide plate 53 (FIG. 3) and is closed at the rear end by the rear wall 58 of the spring cap 41.

The rear wall 58 is formed with fiber letting-out portions 63, 63 for passage therethrough of the optical fibers 42, 42 (FIG. 2). Each spring 44 abuts at the rear end against the rear wall 58 around the respective fiber letting-out portion 63. In the present embodiment, each letting-out portion 63 is provided in a substantially U-shaped slit extending from the upper edge of the rear wall 58. The optical fiber 42 and the protecting projection 54, when the spring cap 41 and the plug housing 40 are fitted together, extend through this slit to the outside of the spring cap 41.

The rear wall 58 has supports 64, 64 projecting rearwardly therefrom. The supports 64, 64 have substantially U-shaped cross section and support the optical fibers 42, 42 let out through the letting-out portions 63, 63. Each support 63 is provided to substantially enclose a lower half of the related letting-out portion (slit) 63 and is upwardly closed, when the spring cap 41 and the plug housing 40 are fitted together, by the related protecting projection 54 (FIG. 1).

With the construction as mentioned above, if the optical plug 33 fits in the receptacle 32, the receiving cylinders 38, 38 of the latter advance into the plug housing 40, while at the same time the small diameter portions 48, 48 of the ferrule units 39, 39 advance into the receiving cylinders 38, 38, at which time the large diameter portions 49, 49 of the ferrule units 39, 39 abut against the front ends of the receiving cylinders 38, 38 with an appropriate pressure resulting from the springs 44, 44. In this condition, the front ends of the ferrule units 39, 39 and the sleeves, and the optical element modules and the sleeves are located relative to each other with a minimum space (not shown) therebetween.

Another embodiment of a spring cap according to this invention will now be described with reference to FIG. 8. An optical plug 65 as shown in FIG. 8, like the optical plug 33 (FIG. 2), is assembled from the ferrule units 39, 39, the plug housing 40 and a spring cap 66.

The spring cap 66 has the same structure as the spring cap 41 in the preceding embodiment (FIG. 4), except that each support 64 is replaced by three protecting projections 67.

The three protecting projections 67, like the protecting projection 54 (FIG. 3), are resilient plate-like cantilever projections provided at the related letting-out portion of the spring cap 66 through which the related optical fiber 42 is let out.

Figure 8:
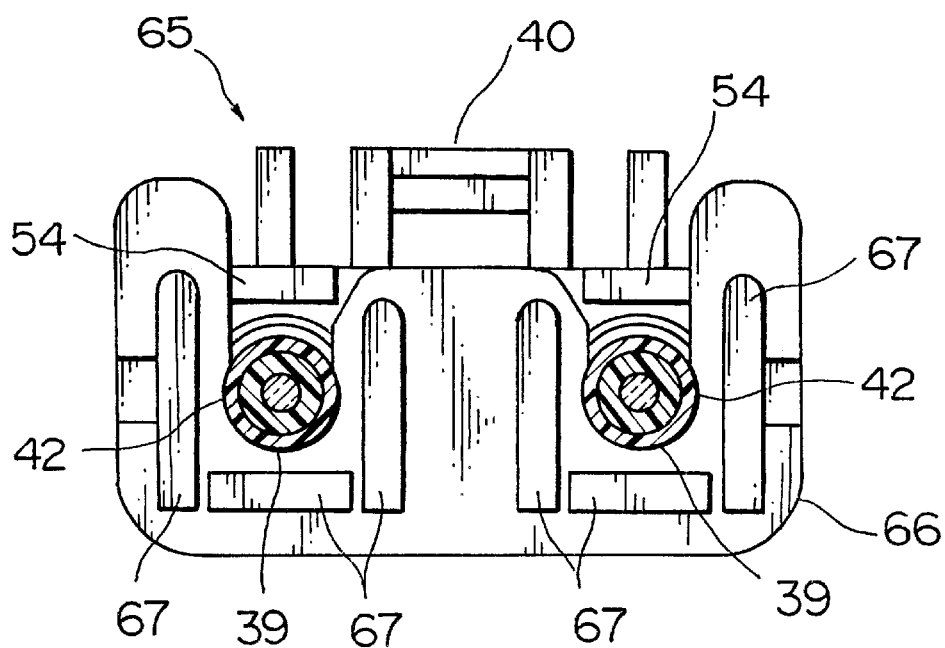
FIG. 8 is a rear view of an optical plug according to this invention, with another embodiment of a spring cap.
Figure 9:
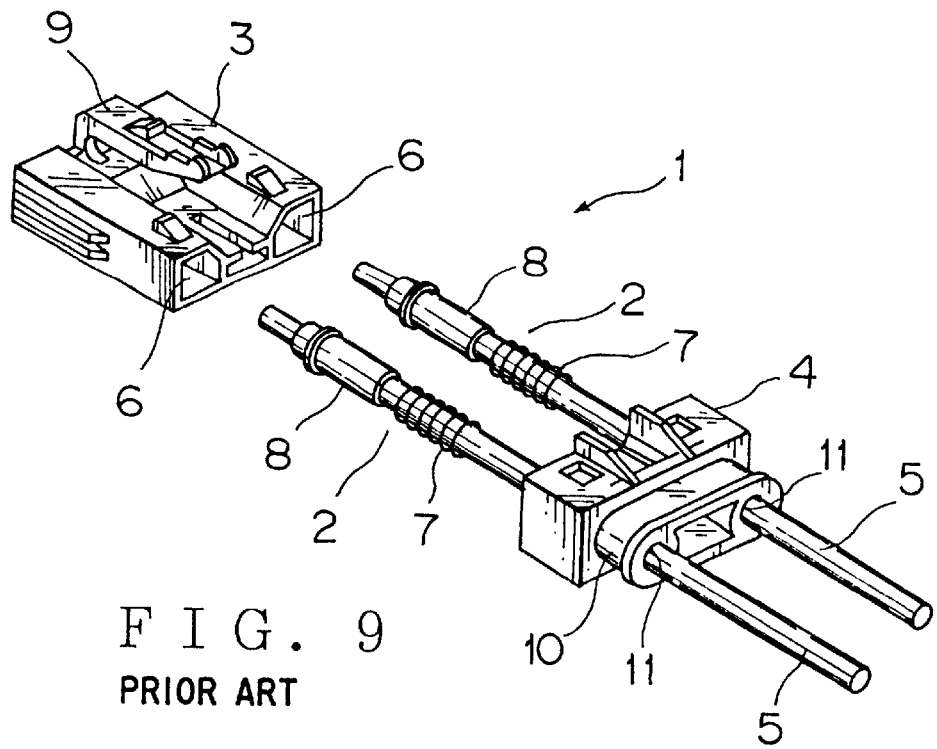
FIG. 9 is a disassembled perspective view of a conventional optical plug.
Figure 10:
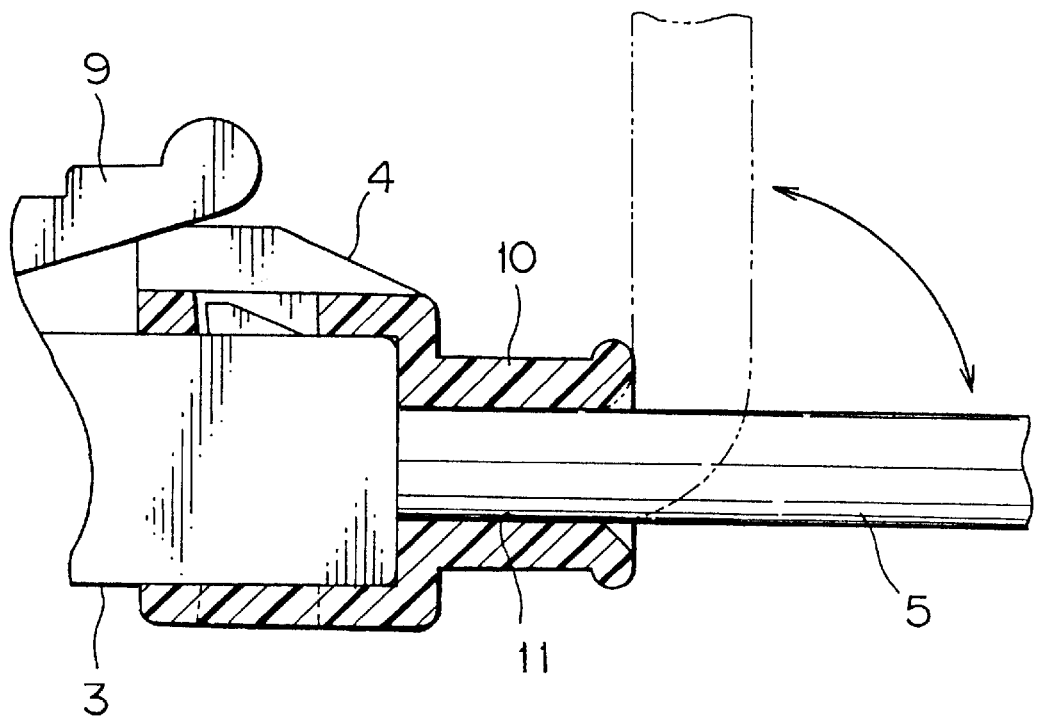
FIG. 10 is a sectional view of an optical fiber support of the optical plug of FIG. 9.

The three protecting projections 67, as shown in FIG. 8, project rearwardly on the left and right and lower sides of the fiber letting-out portion and, along with the protecting projection 54 extending from the plug housing 40, surround the optical fiber 42 let out through the fiber letting-out portion at the four sides, so as to protect the related optical fiber 42 if the optical fiber is excessively bent at any of the angles of 360 degrees. It is to be noted, however, that the number and arrangement of the protecting projections 54, 67 are not limited to those as shown in FIG. 8, and five or more protecting projections may be provided in another arrangement insofar as capable of serving the mentioned effect as protecting projections.

The optical plug 65 with the spring cap 66 employed therein serves the same effect as the optical plug 33 in the preceding embodiment.

Having now fully described the invention, it will be apparent to one of ordinary skill in the art that many changes and modifications can be made thereto without departing from the spirit and scope of the invention as set forth herein. For example, this invention is also applicable to an optical connector for use in a one-core type optical fiber bidirectional communication system.

What is claimed is:

1. An optical connector comprising:
 a ferrule unit including an optical fiber, a ferrule rigidly fitted to one end of said optical fiber, and a spring placed around said optical fiber which abuts at one end against said ferrule;
 a plug housing which receives therein said ferrule unit; and
 a spring cap having a rear wall and a fiber letting-out portion formed in said rear wall through which said optical fiber is let out, said spring cap being fittable, with said spring abutting at an opposite end thereagainst, to said plug housing,
 wherein said plug housing has integrally formed thereon a resilient protecting means projecting from a rear wall of said plug housing which, when said spring cap is fitted to said plug housing, overhangs a part of said optical fiber let out through said fiber letting-out portion of said spring cap.

2. The optical connector according to claim 1, wherein said resilient protecting means comprises a cantilever plate extending in a fitting direction of said spring cap and said plug housing.

3. The optical connector according to claim 1, wherein said resilient protecting means overhangs said part of said optical fiber let out through said fiber letting-out portion, at a side toward which said part of said optical fiber is assumed to be bent.

4. The optical connector according to claim 1, wherein said fiber letting-out portion comprises a slit formed in said rear wall of said spring cap through which said optical fiber and said resilient protecting means extend outside said spring cap.

5. The optical connector according to claim 1, wherein said spring cap has an optical-fiber support of U-shaped cross section provided on said rear wall of said spring cap to surround, along with said resilient protecting means, said part of said optical fiber let out through said fiber letting-out portion.

6. The optical connector according to claim 1, wherein said spring cap has a plurality of resilient cantilever protecting plates provided on said rear wall of said spring cap to surround, along with said resilient protecting means, said part of said optical fiber let out through said fiber letting-out portion.

7. The optical connector according to claim 6, wherein three of said resilient cantilever protecting plates are provided to be located on left and right sides and a lower side of said fiber letting-out portion to surround, along with said resilient protecting means, said part of said optical fiber on a total of four sides around said part of said optical fiber.

* * * * *